United States Patent [19]

Kono et al.

[11] 4,228,144
[45] Oct. 14, 1980

[54] PROCESS FOR THE PREPARATION OF ANHYDROUS MAGNESIUM CHLORIDE HAVING A HIGH DEGREE OF PURITY

[75] Inventors: Hisashi Kono; Kenji Terai; Takazumi Niwa; Katsumi Uemura, all of Ube; Tetsuya Oda, Onoda, all of Japan

[73] Assignee: Ube Industries Ltd., Yamaguchi, Japan

[21] Appl. No.: 12,877

[22] Filed: Feb. 16, 1979

[30] Foreign Application Priority Data

Feb. 22, 1978 [JP] Japan .................................. 53/18578

[51] Int. Cl.$^3$ ............................. C01F 5/30; C01F 5/34
[52] U.S. Cl. ..................................... 423/498; 423/351
[58] Field of Search ......................... 423/497, 498, 351

[56] References Cited

U.S. PATENT DOCUMENTS 3,092,450 6/1963 Christensen et al. ................. 423/498

FOREIGN PATENT DOCUMENTS 05-89519 12/1930 Japan .

Primary Examiner—Earl C. Thomas
Attorney, Agent, or Firm—Miller & Prestia

[57] ABSTRACT

Anhydrous magnesium chloride containing substantially no magnesium oxide is produced by a process comprising reacting magnesium chloride in the form of its hexahydrate with ammonia in the presence of ammonium chloride in an aqueous media; separating the resultant precipitated magnesium chloride hexammoniate crystals from an aqueous solution containing unreacted ammonia, magnesium chloride and ammonium chloride; washing the crystals with liquid ammonia; decomposing the washed crystals into anhydrous magnesium chloride and gaseous ammonia, and; isolating the anhydrous component from the composition mixture; which process is characterized in that a portion of the separated aqueous solution is evaporated until the concentration of ammonia in the resulting residual liquid becomes 2.5% or less; the residual liquid is mixed with fresh magnesium chloride so as to dissolve it in the liquid; the resultant solution is fed into the reacting step, and; the remaining portion of the separated aqueous solution is directly recycled into the reacting step.

12 Claims, 1 Drawing Figure

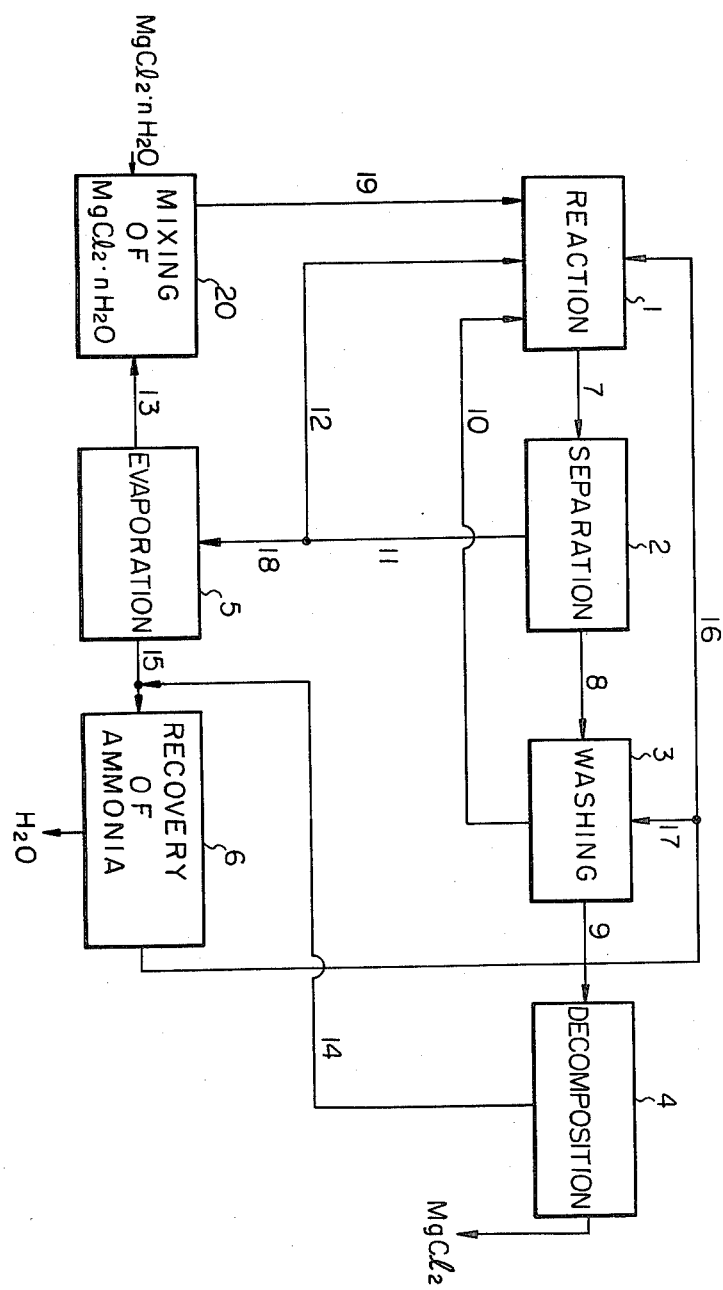

PROCESS FOR THE PREPARATION OF ANHYDROUS MAGNESIUM CHLORIDE HAVING A HIGH DEGREE OF PURITY

FIELD OF THE INVENTION

The present invention relates to a process for the preparation of anhydrous magnesium chloride. More particularly, the present invention relates to a process for the preparation of anhydrous magnesium chloride which has a very high degree of purity and contains substantially no water and magnesium oxide, and from which pure metallic magnesium can be produced by using a molten salt electrolysis method.

BACKGROUND OF THE INVENTION

It is known that magnesium chloride hexammoniate ($MgCl_2 6NH_3$) is usable as a material for producing anhydrous magnesium chloride which can be converted into metallic magnesium by using a molten salt electrolysis method. For example, Japanese Pat. No. 89,519 and U.S. Pat. No. 3,092,450 disclose a process for producing anhydrous magnesium chloride by reacting magnesium chloride with ammonia and by decomposing the resultant magnesium chloride hexammoniate. However, the known processes are technically disadvantageous in that the resultant anhydrous magnesium chloride contains a considerable amount of impurities and causes the degree of purity of the metallic magnesium converted therefrom to be poor. Also, the known processes on the recovery of the sensible refrigerant energy and that of unreacted compounds are economically disadvantageous due to the fact that after the reaction for producing magnesium chloride hexammonite at a low temperature, unreacted compounds in the reaction mixture are neither recovered nor reused, and the sensible refrigerant energy of the reaction mixture is discharged without recovery.

For example, in the process of Japanese Pat. No. 89,519, solid magnesium chloride hexahydrate is directly brought into contact with liquid ammonia at a low temperature to produce magnesium chloride hexammoniate by substituting the hexahydrate ligand group in the magnesium chloride hexahydrate by a hexammoniate ligand group. In this ligand group substitution reaction, first, the ammonia comes into contact with the surface of each solid magnesium chloride hexahydrate particle and, then, penetrates into the inside of the particle. The resultant magnesium chloride hexammoniate is insoluble in the liquid ammonia. Therefore, during the ligand group substitution reaction, the peripheral portion of each magnesium chloride hexahydrate particle is replaced by the resultant solid magnesium chloride hexammoniate layer which obstructs the penetration of the liquid ammonia into the inside of the particle. Accordingly, the resultant magnesium chloride hexammoniate particles contain, in their center portions, the unreacted magnesium chloride hexahydrate as an impurity. When the thus produced magnesium chloride hexammoniate is used for producing anhydrous magnesium chloride, the magnesium chloride hexahydrate contained in the hexammoniate causes the resultant anhydrous magnesium chloride to contain a considerable amount of magnesium oxide. Furthermore, in the process of Japanese Pat. No. 89,519, after the magnesium chloride hexammoniate is separated from the reaction mixture, only unreacted ammonia is recovered from the remaining reaction mixture, and the residual liquid which has a low temperature is discharged without recovering the sensible refrigerant energy of the residual liquid. Also, unreacted magnesium chloride hexahydrate in the reaction mixture is neither recovered nor reused.

In the process of U.S. Pat. No. 3,092,450, an aqueous solution of magnesium chloride and, optionally, a soluble ammonium salt such as ammonium chloride, is added to an aqueous solution containing ammonia, at a low temperature, so as to allow the resulting magnesium chloride hexammoniate to precipitate from the reaction mixture, and then, the magnesium chloride hexammoniate is recovered. In this process, since the reaction of the magnesium chloride hexahydrate with the ammonia is carried out in the homogeneous liquid phase, the resultant magnesium chloride hexammoniate has a relatively high degree of purity. However, after the recovery of the precipitated magnesium chloride hexammoniate, the remaining aqueous solution containing unreacted magnesium chloride, ammonium salt and ammonia, and having a low temperature, is discharged from the reaction system without recovering it. That is, in the above-mentioned process, the sensible refrigerant energy of and the unreacted compounds in the remaining aqueous solution are not re-utilized for this process. Furthermore, in order to recover liquid ammonia from the remaining aqueous solution, it is necessary that, first, a mixture of water and ammonia be separated from the remaining aqueous solution and, then, the liquid ammonia be isolated from the mixture. Accordingly, the isolation of the liquid ammonia from the remaining aqueous solution results in the consumption of an extremely large amount of thermal energy.

In connection with the reuse of the remaining aqueous solution containing magnesium chloride, ammonium chloride and ammonia, it should be noted that, when solid magnesium chloride is dissolved in the remaining aqueous solution, the following undesirable reaction may occur.

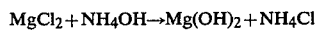

That is, this reaction results in undesirable containing of magnesium oxide in the resultant anhydrous magnesium chloride. Accordingly, the reuse of the remaining aqueous solution should be carried out in such a manner that the generation of the magnesium oxide can be avoided.

SUMMARY OF THE INVENTION

An object of the present invention is to provide a process for the preparation of anhydrous magnesium chloride having a high degree of purity while reusing unreacted compounds and sensible refrigerant energy discharged from the process.

Another object of the present invention is to provide a process for the preparation of anhydrous magnesium chloride which contains substantially no magnesium oxide and, therefore, is very useful for producing pure metallic magnesium.

The above-mentioned object can be attained by using the process of the present invention which comprises the steps of:

reacting magnesium chloride with ammonia in the presence of ammonium chloride in an aqueous medium at a low temperature while allowing the resultant magnesium chloride hexammoniate to precipitate from the reaction mixture;

separating an aqueous solution containing unreacted ammonia, magnesium chloride and ammonium chloride from said precipirated magnesium chloride hexammoniate;

washing said magnesium chloride hexammoniate with liquid ammonia;

decomposing said washed magnesium chloride hexammoniate into anhydrous magnesium chloride and gaseous ammonia, and;

isolating said anhydrous magnesium chloride from said decomposition mixture; and which is characterized in that a portion of said separated aqueous solution is subjected to an evaporation in which an aqueous ammonia solution is removed to such an extent that the residual liquid of said evaporation contains 2.5% by weight or less of ammonia; said residual liquid is mixed with fresh magnesium chloride; said mixture is fed into said reacting step, and; the remaining portion of said separated aqueous solution is directly recycled into said reacting step.

The above-mentioned process of the present invention is effective for readily producing anhydrous magnesium chloride having an extremely high degree of purity with an economical advantage. That is, the disadvantages of the known processes are all eliminated by the process of the present invention.

BRIEF DESCRIPTION OF DRAWING

The accompanying drawing is a flow sheet showing the process of the present invention.

DETAILED DESCRIPTION OF THE INVENTION

Referring to the accompanying drawing, in a reacting step 1, ammonia reacts with magnesium chloride in the presence of ammonium chloride in an aqueous medium at a low temperature, while allowing the resultant magnesium chloride hexammoniate to precipitate from the reaction mixture. In the start of the reaction, fresh ammonia, magnesium chloride and ammonium chloride are fed into the reacting step.

When the reaction is completed, the reaction mixture is forwarded through a path 7 to a separating step 2 in which the reaction mixture is separated into the precipitated magnesium chloride hexammoniate and a remaining aqueous solution containing unreacted magnesium chloride, ammonia and ammonium chloride.

The separated magnesium chloride hexammoniate is forwarded to a washing step 3 through a path 8. In the washing step 3, the separated magnesium chloride hexammoniate is washed with liquid ammonia.

The washed magnesium chloride hexammoniate is forwarded to a decomposing step 4 through a path 9 and decomposed into anhydrous magnesium chloride and gaseous ammonia. The resultant anhydrous magnesium chloride is collected.

In the process of the present invention, the separated aqueous solution in the separating step 2 is recovered through a path 11, and a portion of the aqueous solution is subjected to an evaporating step 5 through a path 18. In the evaporating step 5, ammonia in the form of an aqueous ammonia solution is removed from the separated aqueous solution to such an extent that the residual liquid of the evaporating step contains 2.5% by weight or less, preferably, 2.0% by weight or less, of ammonia. The resultant residual liquid, which consists of an aqueous solution of unreacted magnesium chloride, ammonium chloride and the above-mentioned decreased amount of ammonia, is withdrawn from the evaporating step 5 through a path 13 and mixed with fresh magnesium chloride in a mixing step 20. The mixture is fed into the reacting step 1 through a path 19.

The remaining portion of the separated aqueous solution recovered from the separating step 2 is directly recycled into the reacting step 1 through a path 12.

In the process of the present invention, it is preferable that the waste washing liquid of the washing step 3 be collected and recycled into the reacting step 1 through a path 10. This is because the waste washing liquid contains magnesium chloride, ammonium chloride and water dissolved in liquid ammonia.

Also, it is preferable that the gaseous ammonia generated in the decomposition step 4 be collected through a path 14 and mixed with the aqueous ammonia solution removed from the evaporating step 5, and the mixture is fed into a step for recovering liquid ammonia through a path 15. In this recovering step liquid ammonia is collected and waste water is discharged into the outside of the process system.

Furthermore, it is preferable that a portion of the recovered liquid ammonia be fed into the washing step 3 through a path 17 and the remaining portion of the recovered liquid ammonia is recycled into the reacting step 1 through a path 16.

In the case where all of the steps mentioned above are carried out, necessary amounts of fresh ammonia and ammonium chloride should be fed into the reaction step 1 only in the starting stage of the process, and after the process reaches a normal condition, in theory, the fresh ammonia and ammonium chloride do not need to be added into the reacting step.

The magnesium chloride to be fed into the reacting step 1 may be in the form of magnesium chloride hexahydrate ($MgCl_2.6H_2O$), which may be partially dehydrated ($MgCl_2.NH_2O$, $0<n<6$), and carnallite ($MgCl_2.NH_4Cl.6H_2o$). Usually, magnesium chloride hexahydrate is used for the reaction step. The concentration of the magnesium chloride hexahydrate in the reaction mixture is not limited to a special range. However, it is preferable that the concentration of magnesium chloride hexahydrate be in a range of from 2 to 20% by weight. A concentration smaller than 2% by weight of the magnesium chloride hexahydrate sometimes may results not only in a poor efficiency of reaction with ammonia, but also, in consumption of a large amount of thermal energy for preparing the residual liquid of the evaporating step 5. A concentration larger than 20% by weight of the magnesium chloride hexahydrate in the reaction mixture sometimes may result in production of undesired magnesium hydroxide, which will be converted into magnesium oxide.

Also, in the reacting step, it is preferable that the ammonia ($NH_3$) in the reaction mixture have a concentration of from 50 to 90% by weight. When the concentration of ammonia is lower than 50% by weight, and therefore, concentration of undessociated ammonia is relatively low, sometimes undesired magnesium hydroxide is generated in accordance with the following formula.

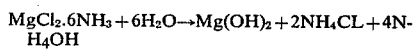
$$MgCl_2.6NH_3 + 6H_2O \rightarrow Mg(OH)_2 + 2NH_4CL + 4NH_4OH$$

This reaction causes the content of magnesium oxide in the resultant anhydrous magnesium chloride to be increased. When the concentration of the magnesium chloride hexahydrate is larger than 70% by weight, a portion of the magnesium chloride hexahydrate may become difficult to dissolve in the reaction mixture. In this case, ammonia reacts with solid magnesium chloride hexahydrate particles and the resultant magnesium chloride hexammoniate deposites on the hexahydrate particles so as to obstruct the penetration of ammonia into the inside of the particles. Accordingly, the resultant magnesium chloride hexammoniate contains therein a considerable amount of unreacted magnesium chloride hexahydrate.

Furthermore, in the reacting step, it is preferable that the concentration of ammonium chloride, which is effective for preventing the formation of magnesium hydroxide in the reaction mixture, be in a range of from 1 to 5% by weight. A concentration of less than 1% of ammonium chloride is sometimes not high enough for preventing the production of magnesium hydroxide during the reacting step. Also, if the concentration of ammonium chloride exceeds 5% by weight, the precipitated magnesium chloride hexammoniate may contain an undesirably large amount of ammonium chloride, which may cause the amount of the liquid ammonia to be used for washing the precipitate to be undesirably too large.

The reacting operation is preferably carried out at a temperature of from $-30°$ to $0°$ C. while the reaction mixture is stirred. The reaction between the magnesium chloride hexahydrate and ammonia in the reaction mixture is carried out along the following course.

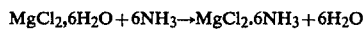

$$MgCl_2,6H_2O + 6NH_3 \rightarrow MgCl_2 \cdot 6NH_3 + 6H_2O$$

That is, the hexahydrate ligand group ($6H_2O$) coordinated to the magnesium ion in magnesium chloride is substituted by a hexammoniate ligand group ($6NH_3$). Generally, the rate of the ligand group substitution reaction is variable depending upon the type of metal ion to which a ligand group is coordinated. In the case of the magnesium ion, the rate of the ligand group substitution reaction is $1 \times 10^{-5}$ seconds, which is a very high rate. Also, the ligand group substitution reaction is exothermic. Accordingly, it is clear that the lower the reaction temperature, the larger the reaction equilibrium constant. This means that the lower the reaction temperature in the range of from $-30°$ to $0°$ C., the larger the yield of the magnesium chloride hexammoniate in the reaction step.

Usually, the reaction step is held for a period of $\frac{1}{2}$ hours or longer, preferably, from $\frac{1}{2}$ to 3 hours. A reaction time shorter than $\frac{1}{2}$ hours sometimes may cause the precipitated magnesium chloride hexammoniate crystals to have such a small size of 50 microns or less that it is difficult to separate the crystals from the reaction mixture within a short time. A reaction time longer than 3 hours will neither result in any technical advantages, nor therefore, results in an economical disadvantage.

The separation of the aqueous solution containing the unreacted ammonia, magnesium chloride and ammonium chloride from the precipitated magnesium chloride hexammoniate in the reaction mixture is preferably carried out at a temperature the same as or lower than the reaction temperature, and within the range of from $-50°$ to $0°$ C. A separation temperature lower than $-50°$ C. may cause the consumption of refrigerant energy to be excessively large. Also, a separation temperature higher than $0°$ C. may sometimes result in a low yield of the precipitated magnesium chloride hexammoniate crystals.

In the process of the present invention, the evaporating operation is carried out until the concentration of ammonia in the residual liquid of the evaporation becomes 2.5% by weight or lower, preferably, 2.0% by weight or lower. This residual liquid contains concentrated magnesium chloride and ammonium chloride which are nonvolatile, and mixed with fresh magnesium chloride, usually, its hexahydrate. When this mixing is carried out, the ammonia in the residual liquid may react with the fresh magnesium chloride as follows.

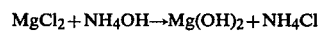

$$MgCl_2 + NH_4OH \rightarrow Mg(OH)_2 + NH_4Cl$$

The rate of the above reaction varies depending upon the concentration of the ammonia in the residual liquid. For example, when the concentration of ammonia is 9.0% by weight of higher, the above-mentioned reaction will occur at a very high rate. The formation of magnesium hydroxide will result in an undesirably high concentration of magnesium oxide in the resultant anhydrous magnesium chloride. However, when the concentration of the ammonia in the residual liquid of the evaporation is 2.5% by weight or less, it has been discovered that the rate of the above-mentioned reaction is extremely low and the production of the magnesium hydroxide during the mixing step is substantially prevented.

The evaporating operation is preferably carried out at a temperature of $80°$ to $110°$ C. under atmospheric pressure. The evaporating operation at a temperature lower than $80°$ C. may cause the evaporating time to be excessively long and, therefore, result in an economical disadvantage. Also, an evaporating temperature higher than $110°$ C. can be obtained only under a pressurized condition, which will result in an economical disadvantage and in an undesirable technical complexity.

In the mixing step, it is preferable that the aqueous solution contain 30 to 70% by weight of the fresh magnesium chloride in terms of its hexahydrate.

The washing operation of the precipitated magnesium chloride hexammoniate with the liquid ammonia is usually carried out at a temperature of $-30°$ C. or lower, because the liquid ammonia is vaporized under atmospheric pressure. The washing operation at a temperature higher than $-30°$ C. should be effected under a pressurized condition capable of preventing the vaporization of ammonia. Preferably, the liquid ammonia is used in an amount of at least 0.5 times, more preferably, from 0.5 to 2.0 times, the weight of the precipitated magnesium chloride hexammoniate crystals to be washed. If the amount of liquid ammonia is less than 0.5 times the weight of the precipitated crystals to be washed, sometimes, it is difficult to completely eliminate water from the precipitated crystals. The use of the liquid ammonia in an amount of more than 2.0 times will not result in any technical advantages and will result in an economical disadvantage.

The decomposing operation of the washed magnesium chloride hexammoniate is usually carried out at a temperature of from $270°$ to $400°$ C. A temperature lower than $270°$ C. may result in a very slow decomposition of the magnesium chloride hexammoniate, and therefore, is economically disadvantageous. A temperature higher than $400°$ C. will cause the resultant ammonia to be thermally decomposed.

The resultant anhydrous magnesium chloride may be melt-purified at a melting-temperature ($712°$ C.) thereof or higher.

The gaseous ammonia generated in the decomposing step and the aqueous ammonia solution obtained in the evaporating step are forwarded into the process for recovering liquid ammonia. This process can be effected by using any conventional process and apparatus, for example, an ammonia recovering column. In this column, the recovery of from 15 to 20 kg/cm$^2$, at an overhead temperature of from 38° to 49° C. and at a bottom temperature of from 200° to 220° C.

The process of the present invention has the following advantages.

1. Since the magnesium chloride in the form of an aqueous solution is brought into contact with ammonia in the form of an aqueous solution, the reaction takes place in a homogenous single phase, and there occurs no such a phenomenon that solid magnesium chloride hexammoniate crystals deposit and cover solid magnesium chloride hexahydrate particles. Accordingly, the entire amount of the magnesium chloride in the reaction mixture can readily react with ammonia and be converted into magnesium chloride hexammoniate. Therefore, the resultant anhydrous magnesium chloride contains an extremely small amount, for example, 0.05% by weight or less, of magnesium oxide, and therefore, has a very high degree of purity.

2. Also, entire amounts of non-volatile compounds, that is, magnesium chloride and ammonium chloride, in the separated aqueous solution of the separating step can be recycled into the reaction step.

3. Since the fresh magnesium chloride to be fed into the reacting step is firstly mixed with the evaporated residual liquid which contains 2.5% by weight or less of ammonia, the production of undesirable magnesium hydroxide can be substantially completely prevented.

4. Since a portion of the separated aqueous solution in the separating step is directly recycled into the reacting step, a considerable amount of the refrigerant energy of the reaction mixture can be reused.

5. The thermal energy consumption for recovering the unreacted ammonia is relatively small.

6. A major portion of the water in the separated aqueous solution in the separating step is reused without evaporation. Only a minor portion of the water is evaporated. Therefore, the energy consumption for evaporating water is relatively small.

7. Since the unreacted magnesium chloride hexahydrate, ammonia and ammonium chloride can be reused, the yield of the anhydrous magnesium chloride is very high.

The features and advantages of the present invention will be further illustrated by the examples set forth below, which are presented for the purpose of illustration only and should not be interpreted as limiting the scope of the present invention. In the following examples, the percentages are based on weight unless otherwise noted.

EXAMPLE 1

A reaction vessel having an inside diameter of 100 mm and an inner volume of 500 ml, which had been cooled to a temperature of −20° C. by using a coolant consisting of dry ice and methyl alcohol, was charged with 200 g of liquid ammonia and 78.8 g of 13.2% aqueous solution of ammonium chloride. The mixture in the reaction vessel was stirred with a stirrer at a rate of 400 rpm. 60 g of a 23.4% aqueous solution of magnesium chloride hexahydrate was uniformly fed into the mixture in the vessel by using a feeding nozzle over a period of time of 30 minutes, while stirring the reaction mixture. 2 hours after the feeding operation was coupled, the reacting operation was completed.

The reaction mixture was discharged into a filter through an outlet located at the bottom of the vessel and filtrated in the filter at a temperature of −20° C. The resultant magnesium chloride hexammoniate crystals were separated from 338.5 g of an aqueous solution containing soon unreacted ammonia, magnesium chloride and ammonium chloride. 105.9 g of the separated aqueous solution was evaporated at a temperature of 98° C., under an ambient pressure, for 1 hour. The residual liquid had a weight of 34 g and contained 1.2% of ammonia. 71.9 g of evaporated ammonia aqueous solution was forwarded to an ammonia recovering column, 30 g of fresh magnesium chloride hexahydrate was dissolved in the residual liquid of the evaporation. The resultant solution was recycled into the reaction vessel. 205.9 g of the remaining aqueous solution separated in the separating step were also recycled into the reaction vessel.

The separated magnesium chloride hexammoniate crystals were washed in the filter at a temperature of −30° C. with 30 g of liquid ammonia. The waste washing liquid was collected and recycled into the reaction vessel. The washed magnesium chloride hexammoniate crystals were placed in a quartz tube, having an inside diameter of 30 mm, the inside space of which had been filled with nitrogen gas. The quartz tube was heated at a temperature of 300° C. for 3 hours, to decompose the magnesium chloride hexammoniate into anhydrous magnesium chloride and gaseous ammonia. The resultant gaseous ammonia was collected and the anhydrous magnesium chloride was melt-refined at a temperature of 750° C. for 0.5 hour. The melt-refined anhydrous magnesium chloride contained an extremely small amount of 0.05% of magnesium oxide. The collected ammonia was forwarded into the ammonia recovery column.

EXAMPLE 2

30 g/hr of magnesium chloride hexahydrate were dissolved in 20.4 g/hr of a residual liquid of an evaporating operation, which will be mentioned hereinafter. The residual liquid contained 1% of ammonia. The resultant solution was mixed with 254.4 g/hr of a separated aqueous solution of a separating step which will be mentioned hereinafter, 21.6 g/hr of liquid ammonia recovered by an ammonia recovery process which will be mentioned hereinafter and 49.2 g/hr of a waste washing liquid of a washing step which will be mentioned hereinafter. The resultant reaction mixture was fed into a reactor. The reactor comprised a cooling cylinder, four reaction pipes having an inside diameter of 16.1 mm and a length of 800 mm and arranged within the cooling cylinder in parallel to the longitudinal axis of the cooling cylinder, a feed inlet for the reaction mixture connected to each of reaction pipe and a discharge outlet for the reaction mixture connected to opposite ends of the pipes. The cylinder had an inlet for introducing a coolant thereinto and an outlet for discharging the coolant therefrom. The coolant inlet was located close to the outlet of the reaction mixture and the coolant outlet was located close to the inlet of the reaction mixture. Accordingly, the reaction mixture flowed through the four reaction pipes in a direction opposite to the flowing direction of the coolant through the cooling cylinder. The reaction mixture in the reaction pipes was cooled to a temperature of −20° C. by the coolant. The reaction mixture discharged from the reactor was fed into a filter and filtrated therein at a temperature of −20° C. 29.1 g/hr of magnesium chloride hexammoniate crystals and 364.4 g/hr of a filtrate were obtained. The obtained magnesium chloride hexammoniate crystals were forwarded to a washing vessel and washed therein with 49.2 g/hr of liquid ammonia, which had been recovered in the recoverying process to eliminate impurities from the magnesium chloride hexammoniate crystals. The entire amount of waste washing liquid discharged from the washing vessel was recycled into the reactor. 29.1 g/hr of the washed magnesium chloride hexammoniate crystals were forwarded into a decomposing furnace and heated therein to a temperature of 300° C. 14.1 g/hr of anhydrous magnesium chloride and 15.1 g of gaseous ammonia were obtained. The entire amount of the anhydrous magnesium chloride was forwarded into a melt-refining furnace and refined therein at a temperature of 750° C. The refined anhydrous magnesium chloride contained an extremely small amount of 0.03% of magnesium oxide.

A portion of the filtrate which corresponded to 73.4% of 346.4 g/hr of the filtrate, was directly recycled into the reactor. The remaining portion of the filtrate was subjected to an evaporating operation, at a temperature of 105° C., so as to decrease the concentration of ammonia in the filtrate to 1%. The evaporated portion of the filtrate was also recycled into the reactor.

55.7 g/hr of ammonia and 16.0 g/hr of water, while were generated in the evaporating step, and 15.1 g/hr of gaseous ammonia generated in the decomposing furnace, were forwarded all together into a gas compressor. The resultant compressed gas was forwarded into a ammonia recovery tower and separated therein into 70.8 g/hr of liquid ammonia are 15.6 g/hr of water. The water was discharged from the process system. A portion of the liquid ammonia was recycled into the reactor and the remaining portion thereof into the washing vessel.

COMPARATIVE EXAMPLE 1

The same procedures as those mentioned in Example 1 were carried out, except that the concentration of ammonia in the residual liquid of the evaporating step was 3%. The resultant refined anhydrous magnesium chloride contained a relatively large amount of 2.2% of magnesium oxide.

COMPARATIVE EXAMPLE 2

The same procedures as those mentioned in Example 2 were conducted, except that no washing operation for the separated magnesium chloride hexammoniate was carried out. The resultant refined anhydrous magnesium chloride contained a large amount of 10.8% of magnesium oxide.

What we claim is:

1. A process for the preparation of anhydrous magnesium chloride, which comprises the steps of:

reacting magnesium chloride with ammonia in the presence of ammonium chloride in an aqueous medium at a temperature of from −30° to 0° C. while allowing the resultant magnesium chloride hexammoniate to precipitate from the reaction mixture;

separating an aqueous solution containing unreacted magnesium chloride ammonia, and ammonium chloride from said precipitated magnesium chloride hexammoniate at a temperature of from −50° to 0° C;

washing said magnesium chloride hexammoniate with liquid ammonia at a temperature of −30° C. or lower;

decomposing said washed magnesium chloride hexammoniate into anhydrous magnesium chloride and gaseous ammonia at a temperature of from 270° to 400° C.;

isolating said anhydrous magnesium chloride from said decomposition mixture, and which is characterized in that a portion of said separated aqueous solution is subjected to evaporation at a temperature of from 80° to 100° C. under an ambient pressure whereby aqueous ammonia solution is removed to such an extent that the residual liquid of said evaporation contains 2.5% by weight or less of ammonia:

mixing said residual liquid with fresh magnesium chloride and feeding said mixture into said reacting step, and directly recycling the remaining portion of said separated aqueous solution into said reacting step.

2. A process as claimed in claim 1, wherein said reaction mixture contains 2 to 20% by weight of magnesium chloride hexahydrate.

3. A process as claimed in claim 1, wherein said reaction mixture contains 50 to 70% by weight of ammonia.

4. A process as claimed in claim 1, wherein said reaction mixture contains 1 to 5% by weight of ammonium chloride.

5. A process as claimed in claim 1, wherein said reaction is carried out for from ½ to 3 hours.

6. A process as claimed in claim 1, wherein said separation of said aqueous solution from said precipitated magnesium chloride hexammoniate is carried out at a temperature not exceeding said reaction temperature.

7. A process as claimed in claim 1, wherein said liquid ammonia for said washing operation is used in an amount of from 0.5 to 2.0 times the weight of said magnesium chloride hexammoniate.

8. A process as claimed in claim 1, wherein said residual liquid of said evaporation contains 2.0% by weight or less of ammonia.

9. A process as claimed in claim 1, wherein said gaseous ammonia generated by said decomposition and said aqueous ammonia solution removed from a portion of said separated aqueous solution are subjected to a process for recovering liquid ammonia.

10. A process as claimed in claim 9, wherein said recovered liquid ammonia is fed into said washing step.

11. A process as claimed in claim 9, wherein said recovered liquid ammonia is recycled into said reacting step.

12. A process as claimed in claim 1, wherein the waste washing liquid in said washing step is recycled into said reacting step.

* * * * *

UNITED STATES PATENT AND TRADEMARK OFFICE
CERTIFICATE OF CORRECTION

PATENT NO. : 4,228,144
DATED : October 14, 1980
INVENTOR(S) : Kono et al

It is certified that error appears in the above–identified patent and that said Letters Patent are hereby corrected as shown below:

Column 7, line 7, after "recovery" insert --of ammonia may be carried out, for example, under a pressure--.

Signed and Sealed this

Third Day of March 1981

[SEAL]

Attest:

RENE D. TEGTMEYER

Attesting Officer

Acting Commissioner of Patents and Trademarks